Figure 1:
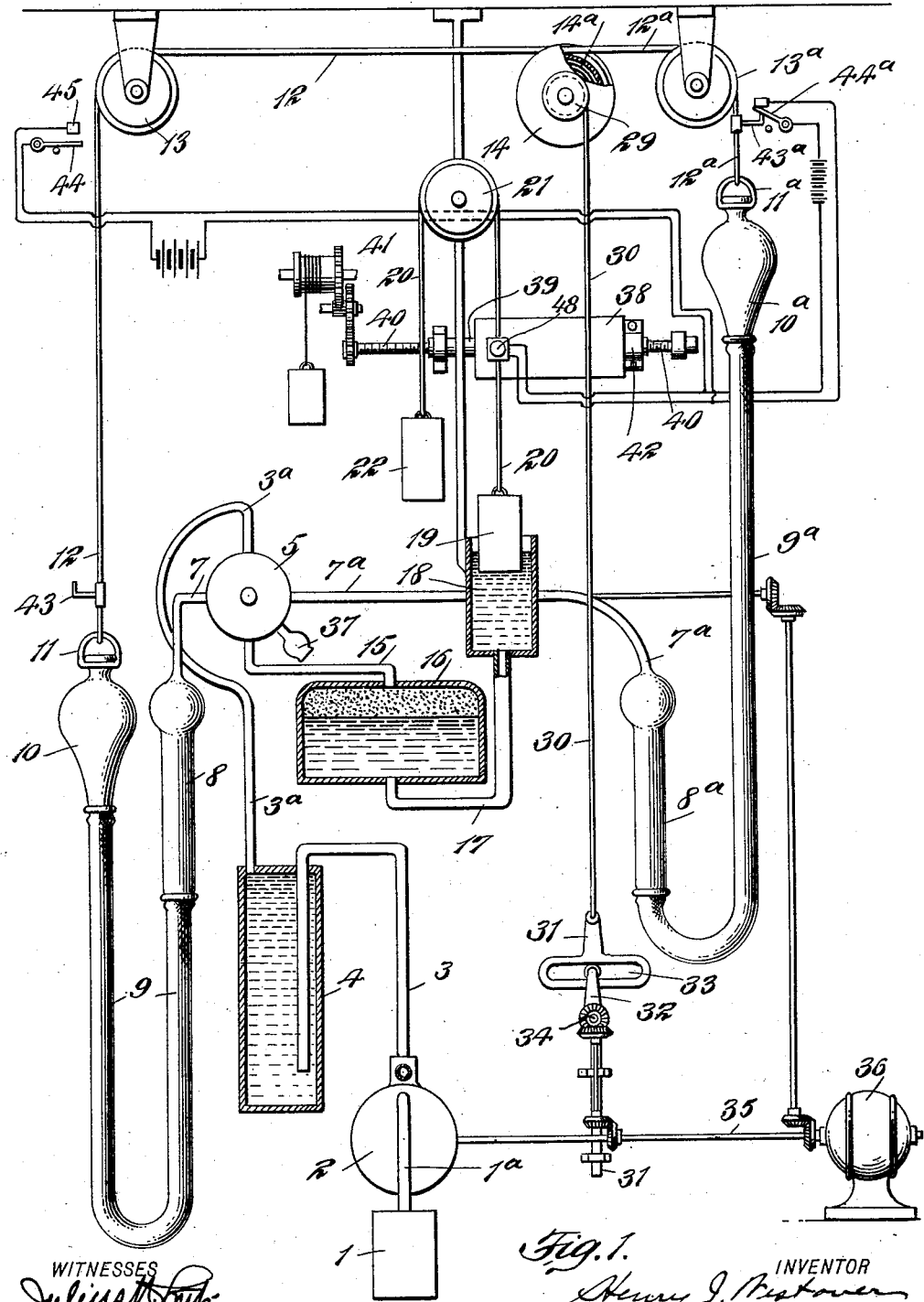

H. J. WESTOVER.
APPARATUS FOR ANALYZING GASES.
APPLICATION FILED NOV. 16, 1907.

899,774.

Patented Sept. 29, 1908.
2 SHEETS—SHEET 1.

WITNESSES

INVENTOR
Henry J. Westover
BY
Davis & Davis
ATTORNEYS

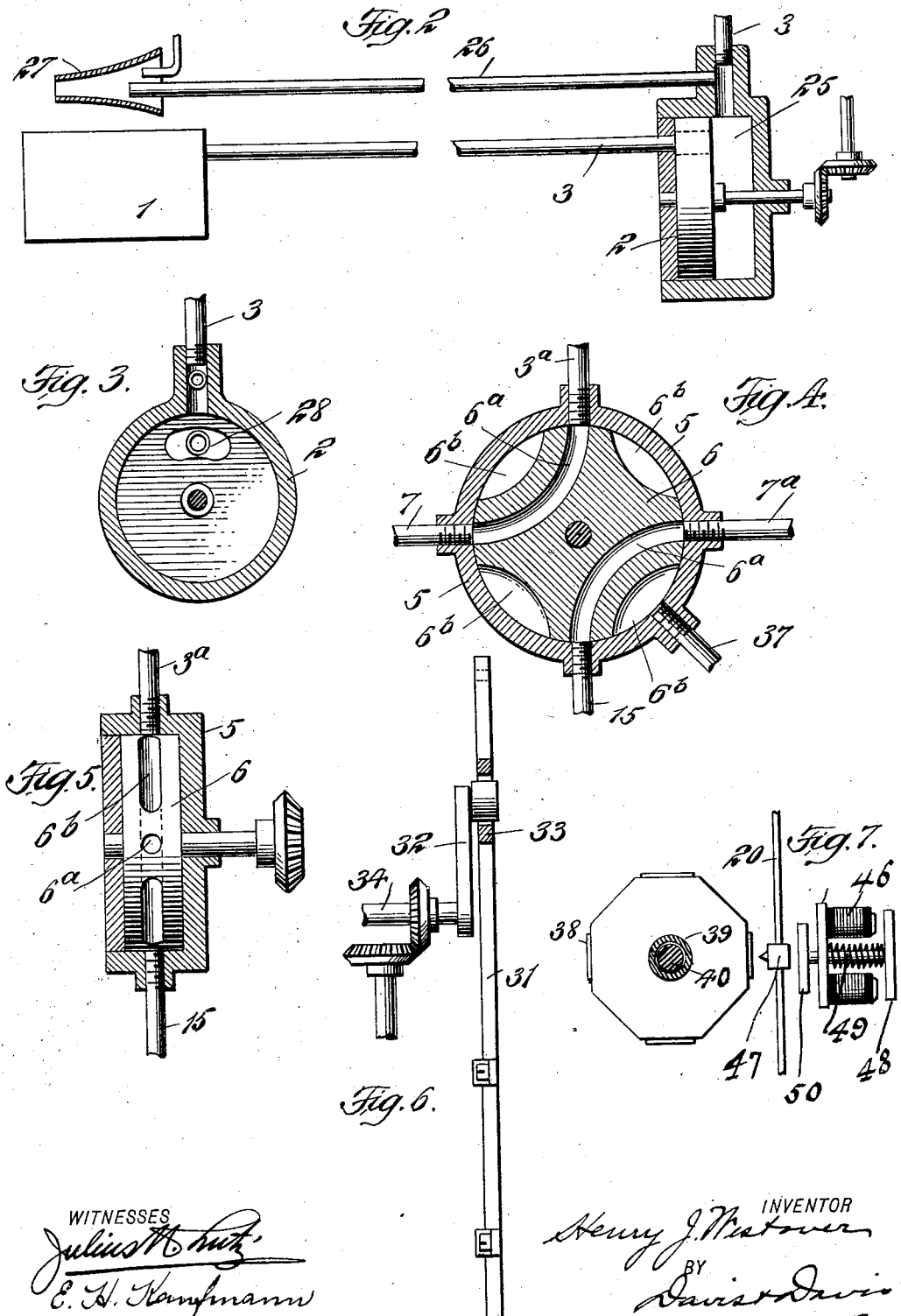

UNITED STATES PATENT OFFICE.

HENRY J. WESTOVER, OF NEW YORK, N. Y.

APPARATUS FOR ANALYZING GASES.

No. 899,774.  Specification of Letters Patent.  Patented Sept. 29, 1908.

Application filed November 16, 1907. Serial No. 402,366.

*To all whom it may concern:*

Be it known that I, HENRY J. WESTOVER, a citizen of the United States, residing in the borough of Manhattan, city, county, and State of New York, have invented certain new and useful Improvements in Apparatus for Analyzing Gases, of which the following is a specification, reference being had therein to the accompanying drawings, in which—

Figure 1 is a diagrammatic view of the apparatus, portions being shown in section; Fig. 2 a detail view of the means for taking gas from a furnace; Fig. 3 a detail view of the valve for taking gas from a furnace; Figs. 4 and 5 detail views of the valve for controlling the movement of the gas from the furnace to the measuring chamber and to the absorption chamber; and Fig. 6 a detail view of the means for operating the two measuring chambers; and Fig. 7, a detail view of the marking device.

This invention has relation to a mechanical means whereby a practically continuous record is automatically produced showing the percentage of carbonic acid present in furnace gases, so as to provide a permanent and reliable indication of the condition of combustion for the guidance of engineers.

One of the many objects of the invention is to provide means whereby a series of measuring chambers may be used to take gas alternately from a furnace, and to deliver a measured quantity of gas into an absorption chamber, one of said measuring chambers receiving the gas from the furnace when another is delivering its charge of gas to the absorption chamber, whereby the apparatus will be rapid in operation, and a measured quantity of gas will be ready to be delivered into the absorption chamber the instant the analysis of a previous charge is completed.

There are many other important objects and advantages of the invention which will be particularly described hereinafter.

It is necessary in the practical and economical maintenance of steam boiler furnaces to provide a permanent, easily read record showing the conditions of combustion in the boiler furnaces by indicating the percentage of $CO_2$ in the furnace gases. The present apparatus is designed to produce such a record by measuring a quantity of furnace gas, passing it into an absorption chamber, and, when the $CO_2$ is absorbed, causing the unabsorbed gases to move a marking point on an indicator card, the movement of said point and the position of the mark made thereby on the card record indicating the amount of $CO_2$ absorbed.

Referring to the various parts by numerals, 1 designates a boiler furnace, said furnace being diagrammatically indicated. This boiler is connected to an intake valve or device 2 by a suitable pipe 1ª. From the valve 2 the gas is lead through pipe 3 to a point near the bottom of a suction regulating chamber 4 filled with water or other suitable sealing liquid. Pipe 3 is open at its lower end and may be extended any suitable distance down into the liquid contained in said chamber, for a purpose which will be hereinafter set forth. The top of chamber 4 is connected by pipe 3ª to a valve casing 5 containing the rotatable valve 6 having a series of ports. To one of the ports in the valve casing a pipe 7 is connected, the lower end of this pipe being in communication with the top of a stationary measuring chamber 8. To the lower end of this measuring chamber is connected a flexible rubber pipe or tube 9 which extends below the measuring chamber a suitable distance and is then turned and brought upward. A small chamber or bottle 10 is connected to the upper end of the tube 9, and carries a ring 11 at its upper end to which the suspending and lifting cord 12 is attached. The cord 12 passes over a suitable pulley 13 and is secured to a drum 14, which serves to support the chamber 10 and the tube 9, and to raise and lower them as will be hereinafter described.

Connected to the valve casing 5 is an outlet pipe 15 which is adapted to be brought into communication with the pipe 7 at the proper point in the rotation of the valve 6, whereby a measured quantity of gas from the chamber 8 will be passed through said pipe as will be hereinafter described. An absorption chamber 16 is connected to the outlet end of pipe 15 so that gas may be delivered from pipe 7 through the valve 6 into said chamber. Within said chamber is arranged any suitable material adapted to absorb carbonic acid. I prefer to use potash, and to place in the chamber a suitable quantity of iron wire netting. Connected to the bottom of the absorption chamber is a pipe 17, which is carried up to a suitable point above the absorption chamber and is connected to the bottom of a displacement chamber 18 in which is contained a suitable liquid. This chamber is open at its top; and arranged to move therein, according to the displacement of the liquid, is a counter-balanced float 19. This float is connected to the lower end of a flexible cord 20 which passes over a suitable pulley 21 and carries at its other end the counter-balance weight 22. The float 19 and weight 22 are equal so that the float 19 will move up and down according to the displacement of the liquid in chamber 18.

Secured to the drum 14 is an actuating drum 29; and wound on said drum is a cord 30 whose lower end is connected to a vertically reciprocating bar 31. This bar is moved vertically by a crank arm 32 which rotates in a yoke 33. The crank arm is carried by a shaft 34 driven by a suitable gearing from the main shaft 35 of the motor 36. The crank 32 is of such length, and the drum 29 is so proportioned with respect to the drum 14, that the required vertical movement of the chamber 10 is secured, and said movement is predetermined and is constant.

The operation of this portion of my apparatus is as follows:—The chamber 10 and tube 9 are supplied with a suitable quantity of liquid and the upper end of the chamber 10 is open to the atmosphere. When the bar 31 is raised by the crank arm 32, the chamber 10 is lowered. This dropping of the chamber 10 causes a corresponding drop of the liquid in the measuring chamber 8. The lowering of the liquid in the chamber 8 produces a vacuum in the upper part of said chamber and in the pipe 7 so that when said pipe is connected to pipe 3$^a$ gas will be drawn from pipe 3 through the liquid in chamber 4 to pipe 3$^a$ and then through the valve 6 and pipe 7 to chamber 8, thereby filling said chamber with a certain quantity of gas from the furnace connected to the valve. At this point the valve 6 rotates cutting off communication with pipe 3$^a$ and placing pipe 7 in communication with pipe 15 leading to the absorption chamber. The crank arm 32 has now made a one-half revolution and is depressing the bar 31 thereby elevating the chamber 10 and the tube 9 connected to it. This causes the liquid in the said chamber and tube to again pass into chamber 8 and to force the gas therefrom into the absorption chamber. When the $CO_2$ is absorbed, the unabsorbed gas forces the liquid from said chamber into the displacement chamber 18. Any movement of the liquid in the displacement chamber causes a corresponding movement of the balanced float 19. The larger the percentage of carbonic acid in the furnace gases the smaller will be the amount of liquid displaced by the unabsorbed gas and consequently the shorter will be the movement of the balanced float 19. When the chamber 10 has reached its maximum height all the gas from the measuring chamber 8 has been driven to the absorption chamber and the unabsorbed gases have lifted the float 19.

Connected to the float 19 is a marking device whereby the height of the weight will be recorded at the completion of each operation, thereby indicating the amount of $CO_2$ absorbed in the chamber 16. It will readily be understood that the movement of the chamber 10 being constant a certain amount of gas will be drawn into the chamber 8 at each movement of the chamber 10, and that said fixed quantity of gas would cause a certain displacement of the liquid in the displacement chamber if all of said gas were forced into the absorption chamber and none of it absorbed. It is, therefore, apparent that the extent of movement of the float 19 will indicate the amount of gas not absorbed in the potash chamber. When the chamber 10 has been raised to its uppermost position and all of the gas from the measuring chamber 8 has been forced into the absorption chamber the valve 6 places the pipe 15 in communication with the escape pipe 37 so that the unabsorbed gases may pass from the absorption chamber to the atmosphere. It will, of course, be understood that if desired the pipe 37 may be connected to a second analyzing apparatus and the unabsorbed gas passed through said second apparatus to determine the amount of other gas elements present therein.

I may employ any form of recording device to make a permanent record of the movement of the float 19. The apparatus shown consists of a horizontal holder 38 mounted on a tube 39. This tube is supported on a threaded shaft, 40 which may be rotated in any suitable way, preferably by a weight motor 41. Secured to the holder is a split nut 42 which engages the screw rod and forces the holder therealong as said rod is rotated.

In order to render the apparatus rapid in operation I connect a second measuring chamber 8$^a$ to the valve casing 5 by a pipe 7$^a$, the valve ports being so arranged as to place said pipe 7$^a$ at the proper times in communication with the pipe 3$^a$ and with the absorption chamber through pipe 15. A second rubber tube 9$^a$ is connected to the lower end of the measuring chamber, and chamber 10$^a$ is connected to the upper end of said tube. A ring 11$^a$ is secured to the chamber 10$^a$ and to said ring is secured a cord 12$^a$ which passes upwardly over a pulley 13$^a$ and is wound upon the drum 14 in a direction the reverse of that of cord 12. The two chambers 10 and 10$^a$ and their attached parts balance each other so that very slight force exerted will cause them to be alternately raised and lowered. Within the drum 14 is secured a suitable spiral spring 14$^a$ which moves said drum in one direction when the bar 31 is lifted by the crank 32. When said bar is depressed by the crank 32 the cord 30 will rotate the drum 14 against the tension of the spiral spring therein.

On the cord 12 is secured an actuating finger 43 which, when the receptacle 10 has been raised to its highest position to force the gas from the measuring chamber 8 into the absorption chamber, engages a movable contact 44 and moves it in engagement with a similar contact 45 thereby completing an electric circuit in which is provided a magnet 46 adjacent the record holder 38. On the cord 20 is secured a suitable marking point 47 which moves vertically in front of the card holder in close proximity thereto. The magnet 46 is provided with an armature 48 which is normally held away from the poles of the magnet by a spring 49. The armature carries a pressure plate 50 located close to the marking point 47 and in such relation thereto that when the circuit is completed through the magnet the plate 50 will engage the marking point and force it against card on the record holder, thereby permanently recording the height of the marking device when all of the gas from the chamber 8 has been forced into the absorption chamber. By this means a permanent record will be made of the amount of $CO_2$ absorbed in the absorption chamber.

On the cord $12^a$ is secured a contact finger $43^a$ which engages a contact $44^a$ when the chamber $10^a$ has been raised to its highest position. The contact pieces 43 and $43^a$ complete the circuits to the magnet 46 which actuate the marking device, said device being operated every time the receptacle 10 or $10^a$ is raised to its highest point.

The valve 6 is formed with ports $6^a$ and $6^b$. The ports $6^a$, as the valve 6 is rotated, connect the measuring chamber to the furnace and to the absorption chamber; while the short ports $6^b$ connect the absorption chamber to the exhaust pipe 37, this valve being so timed in its rotation that the proper connections are made. It will thus be seen that when one measured charge of gas is being delivered into the absorption chamber from one of the measuring chambers the other measuring chamber is being charged with gas from the furnace.

In the valve casing is formed a gas chamber 25 with which the pipe 3 is connected. To this chamber is also connected a pipe 26 to the outer end of which is connected a suction exhaust 27 which tends to cause a vacuum in the chamber 25, the suction on pipe 26, however, being less than the suction of the pipe 3, whereby pipe 3 will be able to take its supply from the chamber 25, notwithstanding the suction on pipe 26. It will, therefore, be seen that as the valve 2 rotates and its port is brought in communication with the inlet from the furnace a supply of gas will be taken from said furnace into the chamber 25 by reason of the suction on pipe 26 and that a proper quantity of gas will be taken from the chamber 25 into the chambers 8 and $8^a$.

The movements of the valve 2 and the valve 6 are so timed that the port 28 in valve 2 will admit gas to chamber 25 from the furnace when the pipe $3^a$ is connected to either pipe 7 or $7^a$.

Having thus described my invention, what I claim as new and desire to secure by Letters Patent, is:—

1. A gas analyzing apparatus comprising a measuring chamber, an absorption chamber, means for drawing gas into the measuring chamber and for forcing it therefrom into the absorption chamber, a displacement chamber containing a liquid and connected to the absorption chamber, marking devices varied in position by the variation of the liquid level in the displacement chamber, and means adapted to operate the marking means when the gas from the measuring chamber has been forced into the absorption chamber.

2. A gas analyzing apparatus comprising a measuring chamber, an absorption chamber, means for drawing gas into the measuring chamber and for forcing it therefrom into the absorption chamber, a displacement chamber containing a liquid and connected to the absorption chamber, a marking means varied in position by the variation of the liquid level in the displacement chamber, and means adapted to instantaneously operate the marking means to indicate the position of said marking means when the gas from the measuring chamber has been forced into the absorption chamber.

3. A gas analyzing apparatus comprising a measuring chamber, means for forming a partial vacuum in said chamber, means for connecting said chamber to a furnace whereby the furnace gases will be drawn into said chamber, an absorption chamber, means for delivering the measured charge of gas into said absorption chamber, a displacement chamber containing a liquid and connected to the absorption chamber, a counter-balanced float controlled by the liquid in said displacement chamber, a marking device moved by said counter-balanced float, and actuating means connected to said marking device and adapted to operate only when all of the gas from the measuring chamber has been forced into the absorption chamber.

4. A gas analyzing apparatus comprising a measuring chamber, means for drawing gas into said chamber, an absorption chamber containing a liquid and connected to the measuring chamber, a displacement chamber containing a liquid and connected to the bottom of the absorption chamber whereby gas in passing into the absorption chamber will force a portion of the contents thereof into the displacement chamber to thereby vary the level of the liquid in the displacement chamber, a marking device varied in position by the variations in the level of the liquid in the displacement chamber, and means adapted to operate the marking device when the gas from the measuring chamber has been forced into the absorption chamber.

5. A gas analyzing apparatus comprising a measuring chamber having a single gas connection at its upper end, means connected to the lower end of said chamber to draw gas therein, an absorption chamber, means to disconnect the measuring chamber from its furnace connection and to connect it to the absorption chamber, a displacement chamber connected to the absorption chamber, and means to record the variations in the level of the liquid in the displacement chamber.

6. A gas analyzing apparatus comprising a valve adapted to be connected to a furnace, a plurality of measuring chambers, means for drawing gas into said chambers successively and forcing it therefrom, means for connecting said chambers alternately to the valve, an absorption chamber adapted to be connected to the measuring chambers in succession whereby each measured quantity of gas will be forced into the absorption chamber, a displacement chamber connected to the absorption chamber and containing a liquid whose level will be varied according to the amount of unabsorbed gas in the absorption chamber, and a marking device to indicate the variation in height of the liquid in the displacement chamber.

7. A gas analyzing apparatus comprising a valve adapted to be connected to a furnace, a plurality of measuring chambers, means for drawing gas into said chambers and forcing it therefrom, means for connecting said chambers alternately to the valve, an absorption chamber adapted to be connected to the measuring chamber in succession whereby each measured quantity of gas will be forced into the absorption chamber, a displacement chamber connected to the absorption chamber, and containing means adapted to be moved by the unabsorbed gas in the absorption chamber, and devices controlled by said movable means to indicate the amount of unabsorbed gas in the absorption chamber.

8. A gas analyzing apparatus comprising a valve adapted to be connected to a furnace, a plurality of measuring chambers, means for drawing gas into said chambers successively and forcing it therefrom, means for connecting said chambers alternately to the valve, an absorption chamber adapted to be connected to the measuring chamber in succession whereby each measured quantity of gas will be forced into the absorption chamber, a displacement chamber connected to the absorption chamber, containing a liquid whose level varies according to the amount of unabsorbed gas in the absorption chamber, a marking device whose position is varied according to the level of the liquid in the displacement chamber, means for actuating said marking device, a movable means for carrying a record card adjacent the marking device, and means for moving the card-carrying device to correspond with the movement of the valve.

9. A gas analyzing apparatus comprising a valve adapted to be connected to a furnace, a plurality of measuring chambers, means for drawing gas into said chambers and forcing it therefrom, means for connecting said chambers successively alternately to the valve, an absorption chamber adapted to be connected to the measuring chambers in succession whereby each measured quantity of gas will be forced into the absorption chamber, a displacement chamber connected to the absorption chamber, containing a liquid whose level varies according to the amount of unabsorbed gas in the absorption chamber, a marking device whose position is varied according to the level of the liquid in the displacement chamber, a movable means for carrying a record card adjacent the marking device, means for moving the card-carrying device to correspond with the movement of the valve, and electrical means adapted to actuate the marking device when all of the gas has been forced from one of the measuring chambers.

10. A gas analyzing apparatus comprising a valve adapted to be connected to a furnace, a plurality of measuring chambers, means for drawing gas into said chambers successively and forcing it therefrom, means for connecting said chambers alternately to the valve, an absorption chamber adapted to be connected to the measuring chamber in succession whereby each measured quantity of gas will be forced into the absorption chamber, a displacement chamber connected to the absorption chamber, containing a liquid whose level varies according to the amount of unabsorbed gas in the absorption chamber, a marking device whose position is varied according to the level of the liquid in the displacement chamber, a movable means for carrying a record card adjacent the marking device, means for moving the card-carrying device to correspond with the movement of the valve, and means for actuating the marking device each time the gas is forced from one of the measuring chambers.

11. A gas analyzing apparatus comprising a valve adapted to be connected to a furnace, a plurality of measuring chambers, means for drawing gas into said chambers successively and forcing it therefrom, means for connecting said chambers alternately to the valve, an absorption chamber adapted to be connected to the measuring chamber in succession whereby each measured quantity of gas will be forced into the absorption chamber, a displacement chamber connected to the absorption chamber and containing a liquid, a balanced weight in said chamber, a marking device controlled by the position of said balanced weight, a card holder, means for moving said card holder to correspond to the movement of the valve, and means for actuating the marking device whenever the gas is forced from one of the measuring chambers into the absorption chamber.

12. A gas analyzing apparatus comprising a valve adapted to be connected to a furnace, a plurality of measuring chambers, means for drawing gas into said chambers successively and forcing it therefrom, means for connecting said chambers alternately to the valve, an absorption chamber adapted to be connected to the measuring chambers in succession whereby each measured quantity of gas will be forced into the absorption chamber, a displacement chamber connected to the absorption chamber and containing a liquid, a balanced weight in said chamber, a marking device controlled by the position of said balanced weight, a card holder, means for moving said card holder to correspond to the movement of the valve, electrical means for actuating the marking device when gas is forced from one measuring chamber into the absorption chamber, and electrical means for controlling the movement of the card holder.

13. A gas analyzing apparatus comprising a valve adapted to be connected to a furnace, a plurality of measuring chambers, means for drawing gas into said chambers successively and forcing it therefrom, means for connecting said chambers alternately to the valve, an absorption chamber adapted to be connected to the measuring chamber in succession whereby each measured quantity of gas will be forced into the absorption chamber, a displacement chamber connected to the absorption chamber and containing a liquid, a balanced weight in said chamber, a marking device controlled by the position of said balanced weight, a card holder, means for moving said card holder to correspond to the movement of the valve, and means for actuating the marking device whenever the gas is forced from one of the measuring chambers into the absorption chamber.

14. A gas analyzing apparatus comprising a valve adapted to be connected to a furnace, a plurality of measuring chambers, means for drawing gas into said chambers successively and forcing it therefrom, means for connecting said chambers alternately to the valve, an absorption chamber adapted to be connected to the measuring chamber in succession whereby each measured quantity of gas will be forced into the absorption chamber, a displacement chamber connected to the absorption chamber and containing a liquid, a balanced weight in said chamber, a marking device controlled by the position of said balanced weight, a card holder, means for actuating the marking device whenever the gas is forced from one of the measuring chambers into the absorption chamber, an independent motor for moving the card holder, electrical means for controlling said motor.

15. A gas analyzing apparatus comprising a measuring chamber, a flexible tube connected to the bottom of said chamber, a bottle or chamber connected to the free end of said tube, means for raising and lowering said bottle, means for connecting the upper end of the measuring chamber to a furnace and to an absorption chamber whereby a measured quantity of gas may be taken from a furnace into the measuring chamber and then delivered into the absorption chamber, a displacement chamber containing a liquid and in communication with the bottom of the absorption chamber, a marking device controlled by the level of the liquid in the displacement chamber, and means to actuate said marking device only when the bottle is raised to its highest point above the measuring chamber.

16. A gas analyzing apparatus comprising a plurality of measuring chambers operating in succession to receive gas from a furnace, a single absorption chamber to receive said charges of gas in succession, and a recording device controlled by the gas in the absorption chamber to indicate the quantity of gas therein.

17. A gas analyzing apparatus comprising a pair of measuring chambers to draw gas from a furnace alternately, an absorption chamber to receive said charges of gas from said measuring chambers in succession, and a recording apparatus automatically operating to record the amount of gas in the absorption chamber.

18. A gas analyzing apparatus comprising a pair of gas measuring chambers, an absorption chamber, means whereby one of said measuring chambers will be receiving gas from the furnace while the other is delivering its gas to the absorption chamber, and means automatically actuated to record the amount of gas in the absorption chamber as said chamber is charged from each measuring chamber.

19. A gas analyzing apparatus comprising a pair of gas measuring chambers, an absorption chamber, means whereby one of said measuring chambers will be receiving gas from the furnace while the other is delivering its gas to the absorption chamber, and electrical means to record the amount of gas in the absorption chamber as said chamber is charged for each measuring chamber.

20. A gas analyzing apparatus comprising a measuring chamber having a single gas connection, an absorption chamber, means for successively placing the measuring chamber in communication with a furnace and with the absorption chamber, means for drawing gas into the measuring chamber when said chamber is in communication with the furnace, and for forcing gas from the measuring chamber into the absorption chamber when said measuring chamber is in communication with the absorption chamber, and means to indicate the amount of gas absorbed in the absorption chamber.

21. A gas analyzing apparatus comprising a measuring chamber having a gas connection, a vertically movable liquid container, flexible means for connecting said container to the lower end of said chamber, means for raising and lowering said container, means for connecting the upper end of the measuring chamber to a furnace and to an absorption chamber, a marking device to indicate the amount of unabsorbed gas in the absorption chamber, and means operated by the container at the highest point in its movement to operate the marking device.

22. A gas analyzing apparatus comprising a measuring chamber, means for connecting said chamber to a furnace whereby gas may be drawn into said measuring chamber, a liquid container open at its upper end, flexible means connected to the lower end of said container and to the lower end of the measuring chamber, an absorption chamber to receive gas from the measuring chamber, a marking device adapted to be positioned by the unabsorbed gas in the absorption chamber, means for vertically moving the container, and means actuated by the container-moving means to operate the marking device when the container is at the highest point in its movement.

23. A gas analyzing apparatus comprising a measuring chamber, means for filling said chamber with gas from a furnace, an absorption chamber, means for delivering the gas from the measuring chamber into the absorption chamber, a marking device adapted to be positioned by the unabsorbed gas in the absorption chamber, and means to electrically operate said marking device when all of the gas from the measuring chamber has been delivered into the absorption chamber.

24. A gas analyzing apparatus comprising a measuring chamber, means for filling said chamber with gas from a furnace, an absorption chamber, means for delivering the gas from the measuring chamber into the absorption chamber, a displacement chamber, a counter-balanced float in said displacement chamber, a marking device positioned by said counter-balanced float, and means to electrically operate said marking device when all of the gas from the measuring chamber has been delivered into the absorption chamber.

25. A gas analyzing apparatus comprising a measuring chamber, means for filling said chamber with gas from a furnace, an absorption chamber, means for delivering the gas from the measuring chamber into the absorption chamber, a marking device adapted to be positioned by the unabsorbed gas in the absorption chamber and consisting of a marking point and means for moving said point when all of the gas from the measuring chamber has been delivered into the absorption chamber.

26. A gas analyzing apparatus comprising a measuring chamber, means for filling said chamber with gas from a furnace, an absorption chamber, means for delivering the gas from the measuring chamber into the absorption chamber, a marking device adapted to be positioned by the unabsorbed gas in the absorption chamber and consisting of a marking point and electrical means for moving said point when all of the gas from the measuring chamber has been delivered into the absorption chamber.

27. A gas analyzing apparatus comprising a measuring chamber, means for connecting said chamber to a furnace whereby gas may be drawn into said measuring chamber, a liquid container open at its upper end, flexible means connected to the lower end of said container and to the lower end of the measuring chamber, an absorption chamber to receive gas from the measuring chamber, an electrically operated marking device adapted to be positioned by the unabsorbed gas in the absorption chamber, means for vertically moving the container, and means to complete the circuit of the marking device when the container is at the highest point in its movement.

In testimony whereof I hereunto affix my signature in the presence of two witnesses this 24th day of October 1907.

HENRY J. WESTOVER.

Witnesses:
 WM. R. DAVIS,
 EMMA H. H. KAUFMANN.